US012112621B2

(12) United States Patent
Radakovic et al.

(10) Patent No.: US 12,112,621 B2
(45) Date of Patent: Oct. 8, 2024

(54) METHOD AND APPARATUS FOR TRAFFIC REPORT CERTAINTY ESTIMATION

(71) Applicant: HERE Global B.V., Eindhoven (NL)

(72) Inventors: Daniela Radakovic, Chicago, IL (US); Arnold Sheynman, Northbrook, IL (US); Kyle Jackson, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 478 days.

(21) Appl. No.: 17/477,074

(22) Filed: Sep. 16, 2021

(65) Prior Publication Data

US 2022/0092970 A1 Mar. 24, 2022

Related U.S. Application Data

(60) Provisional application No. 63/082,251, filed on Sep. 23, 2020.

(51) Int. Cl.
*G08G 1/01* (2006.01)

(52) U.S. Cl.
CPC ......... *G08G 1/0129* (2013.01); *G08G 1/0112* (2013.01); *G08G 1/0141* (2013.01); *G08G 1/0145* (2013.01)

(58) Field of Classification Search
CPC .. G08G 1/0112; G08G 1/0129; G08G 1/0141; G08G 1/0145
See application file for complete search history.

(56) References Cited

U.S. PATENT DOCUMENTS

| | | | |
|---|---|---|---|
| 9,257,041 B2 | 2/2016 | Scofield et al. | |
| 9,489,838 B2 | 11/2016 | Fowe et al. | |
| 2005/0096839 A1 | 5/2005 | Nakano et al. | |
| 2013/0289862 A1 | 10/2013 | Chapman et al. | |
| 2020/0160695 A1 * | 5/2020 | Liu | G08G 1/012 |

FOREIGN PATENT DOCUMENTS

| | | |
|---|---|---|
| CN | 103093625 B | 5/2013 |
| WO | 2016192668 A1 | 12/2016 |

* cited by examiner

*Primary Examiner* — Jaime Figueroa
*Assistant Examiner* — Zachary Joseph Wallace
(74) *Attorney, Agent, or Firm* — DITTHAVONG, STEINER & MLOTKOWSKI

(57) ABSTRACT

A method, apparatus, and non-transitory computer readable storage medium for traffic report certainty estimation. The approach may include determining at least one data input to a traffic model for generating a traffic report estimation for a road segment. The approach may also involve determining at least one input characteristic value associated with the at least one data input based, at least in part, on probe data collected from one or more sensors of at least one probe device. The approach may further involve determining a coefficient of certainty value from a certainty table based on the at least one input characteristic value, wherein the certainty table respectively maps one or more value intervals of the at least one input characteristic value to a pre-assigned coefficient of certainty value, and providing the coefficient of certainty value as an output associated with the traffic report.

20 Claims, 11 Drawing Sheets

FIG. 5

500

LOOK-UP TABLE

| row number | real-time (%) | >= 1 fresh UV (%) | coefficient of certainty value |
|---|---|---|---|
| 1 | 50-100 | 0 | 0.65 |
| 2 | 50-100 | 0-50 | 0.70 |
| 3 | 50-100 | 50-100 | 0.75 |
| 4 | 50-100 | 100 | 0.80 |
| 5 | 100 | 0 | 0.85 |
| 6 | 100 | 0-50 | 0.90 |
| 7 | 100 | 50-100 | 0.95 |
| 8 | 100 | 100 | 0.99 |

700

METHOD AND APPARATUS FOR TRAFFIC REPORT CERTAINTY ESTIMATION

RELATED APPLICATION

This application claims priority from U.S. Provisional Application Ser. No. 63/082,251, entitled "METHOD AND APPARATUS FOR TRAFFIC REPORT CERTAINTY ESTIMATION," filed on Sep. 23, 2020, the contents of which are hereby incorporated herein in their entirety by this reference.

BACKGROUND

Consumers have found tremendous use for traffic feeds provided by mapping service providers. These traffic feeds or traffic reports are generally created from a variety of data inputs with different levels of certainty. The levels of certainty of the data, in turn, can affect how consumers will use the data. Accordingly, service providers face significant technical challenges with respect to automatically determining the certainty that a traffic report (e.g., reported traffic speed on a road link) represents actual traffic conditions, particularly when the traffic report certainty estimation is performed in real time.

Some Example Embodiments

Therefore, there is a need for an approach for service providers to determine and convey the certainty of traffic reports.

According to one embodiment, a method comprises a traffic report for a road segment based on real-time probe data collected from one or more sensors of at least one probe device. The method also comprises calculating a real-time spatial coverage parameter for the road segment, wherein the real-time spatial coverage parameter indicates a percentage of the road segment covered by the real-time probe data. The method further comprises mapping the real-time spatial coverage parameter to a pre-defined interval of a certainty table associated with the road segment to determine a coefficient of certainty value for the traffic report, and providing the coefficient of certainty value as an output.

According to another embodiment, an apparatus comprising at least one processor, and at least one memory including computer program code for one or more programs, the at least one memory and the computer program code configured to, with the at least one processor, cause the apparatus to calculate a traffic report for a road segment based on real-time probe data collected from one or more sensors of at least one probe device. The apparatus is also caused to calculate a real-time spatial coverage parameter for the road segment, wherein the real-time spatial coverage parameter indicates a percentage of the road segment covered by the real-time probe data. The apparatus is further caused to map the real-time spatial coverage parameter to a pre-defined interval of a certainty table associated with the road segment to determine a coefficient of certainty value for the traffic report, and provide the coefficient of certainty value as an output.

According to another embodiment, a computer-readable storage medium carrying one or more sequences of one or more instructions which, when executed by one or more processors, cause an apparatus to determining at least one data input to a traffic model for generating a traffic report estimation for a road segment. The apparatus is also caused to determining at least one input characteristic value associated with the at least one data input based, at least in part, on probe data collected from one or more sensors of at least one probe device. The apparatus is further caused to determining a coefficient of certainty value from a certainty table based on the at least one input characteristic value, wherein the certainty table respectively maps one or more value intervals of the at least one input characteristic value to a pre-assigned coefficient of certainty value, and providing the coefficient of certainty value as an output associated with the traffic report.

According to another embodiment, an apparatus comprises means for determining at least one data input to a traffic model for generating a traffic report estimation for a road segment. The apparatus also comprises means for determining at least one input characteristic value associated with the at least one data input based, at least in part, on probe data collected from one or more sensors of at least one probe device The apparatus further comprises means for determining a coefficient of certainty value from a certainty table based on the at least one input characteristic value, wherein the certainty table respectively maps one or more value intervals of the at least one input characteristic value to a pre-assigned coefficient of certainty value, and providing the coefficient of certainty value as an output associated with the traffic report.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 depicts a look-up table, according to one embodiment;

DESCRIPTION OF SOME EMBODIMENTS

Figure 1:
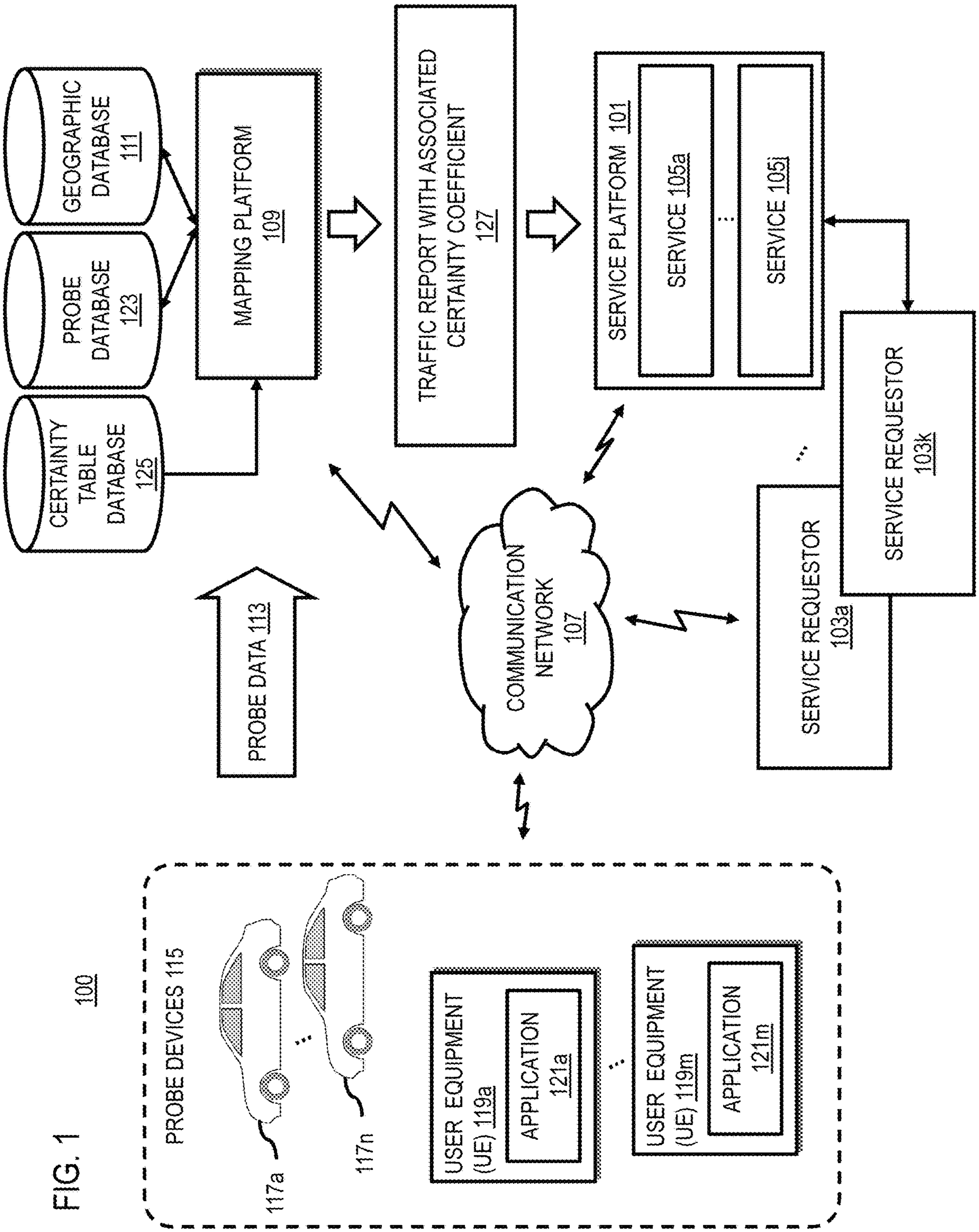
FIG. 1 is a diagram of a system capable of traffic report certainty estimation according to one embodiment.

A method and apparatus for traffic report certainty estimation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Some embodiments of the present disclosure will be described hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present disclosure. Thus, use of any such terms should not be taken to limit the spirit and scope of embodiments of the present disclosure.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

FIG. 1 is a diagram that illustrates a system 100 capable of traffic report certainty estimation according to one embodiment. The use of traffic reports (e.g., provided via a traffic data service platform 101), has become widespread through the use of navigation applications and the increasing reliance on autonomous driving features. Such traffic reports may include information such as traffic incident, traffic congestion, and traffic flow data. For example, service requestors 103*a*-103*k* (e.g., collectively referred to as service requestors 103 who are customers of traffic reports) often rely on traffic report service providers 105*a*-105*j* (e.g., also collectively referred to as traffic report service providers 105) to help them ascertain or convey past, current, and future traffic conditions. Service requestors 103 can request traffic reports from the traffic data service platform 101 over a communication network 107. Traffic service providers can improve the navigation experience by providing a level of certainty for given set of traffic report data.

In general, a route can be defined by its start, its end (destination), and an ordered series of road segments between those two points. A mapping platform 109, for instance, can use a node-link representation or equivalent to represent a network of road segments in a geographic database 111 (e.g., see the description of the geographic database 111 below for a detailed discussion of the node-link representation. Route selection algorithms, for instance, can be based on traffic reports (e.g., traffic condition estimation, traffic information, traffic report estimations, etc.), which, for example, may be represented by a road segment's speed. Therefore, these algorithms are heavily impacted by the accuracy of traffic report estimates.

Traffic report estimation (e.g., traffic reports, traffic condition estimation) is a complex and, in most cases, underdefined problem. Existing traffic report estimation algorithms rely on information received from a fraction of vehicles on a road. In cases where no real-time data from vehicles on the road is available, or the real-time data is sparse, traffic report estimations are based on historical data (e.g., historical traffic patterns, historical traffic data) or a combination of historical data and real-time data, which lowers reliability of traffic reports. Increasing the availability of real-time data (e.g. real-time probe data) from vehicles increases the reliability of the traffic report. Using speed data as an example, the accuracy of describing speed through a traffic report (e.g., travel time, level of service (LOS)) increases with more real-time speed data.

Traffic report estimation becomes more complex, in part, because the behavior of vehicles on a road segment may not be uniform, especially on arterial roads. For example, as a traffic light changes from green to red, there may be, on the same road segment, vehicles braking for the red light as well as vehicles speeding through the end of the green light. In another example, a road segment may have vehicles continuing straight at full speed, as well as vehicles initiating left turns that require braking or stopping. Therefore, traffic report estimations may be highly dependent on which vehicles provide the input data to the traffic model.

Even assuming the availability of real-time data from all vehicles on a road segment, the level of uniformity in the real-time data impacts the certainty of a traffic report estimation, especially in complex traffic conditions. For example, if all the real-time speed data for a road segment used in a traffic report estimation is similar to each other, the certainty that a reported average speed corresponding well with actual speeds is high. If the real-time speed data, however, varies widely, as occurs with complex traffic conditions, then the certainty that the reported averaged speed corresponding well with the actual speed is low. Further, with varied real-time speed data, the traffic report estimation will not properly correspond with the traffic phenomena on the road (e.g., vehicles going straight and vehicles waiting to make a left turn).

Accordingly, service providers are challenged to complement a reported road segment speed (or any other reported traffic condition or parameter) with a certainty value that indicates a level of certainty that the reported road segment speed or other traffic-related attribute corresponds with the actual traffic conditions.

Different methodologies for certainty value computation and different metrics for determining certainty values exist depending on the provider. Consequently, certainty values are difficult to interpret and even more difficult to compare by the traffic services users. For example, a certainty value can be a number between 0.0 and 1.0 and may indicate the percentage of real-time data included in the calculation of reported speed: 0<C<=C1 indicates reporting of only the posted speed limit; C1<C<=C2 indicates use of historical traffic pattern; C2<C<=1.0 indicates that the reported speed is derived from a mix of real-time vehicle information and historical traffic patterns. The C1 and C2 thresholds may be selected by the provider and may be selected ad hoc. Depending on the threshold values selected for C1 and C2, the same certainty value can indicate different qualities of the traffic report.

Since certainty values must be computed for each road segment and with each traffic information update, which may occur frequently (e.g., every millisecond, every second, every minute), a method or system's efficiency in computing certainty values is important. A minimally complex method that is efficient in terms of computational resources is preferred.

To address these technical challenges, the system 100 of FIG. 1 introduces a capability for traffic report certainty estimation. As noted above, the traffic report certainty estimation indicates a level of certainty that a traffic report (e.g., reported speed or other reported traffic attribute such as traffic volume, traffic incidents, etc.) corresponds to actual traffic conditions. In one embodiment, this certainty value is not a statistical measure averaged over a period of time and number of road segments in an area of interest, but rather, the value is computed using the exact available inputs at a point in time, for a specific road segment, for a given model, and taking into consideration the physics of traffic. This value is of tremendous use to consumers of traffic feeds, as it allows them to decide how to best utilize the associated traffic condition information and interpret it correctly.

In one embodiment, the traffic report certainty estimation may be based on qualifying the inputs available to a traffic model (e.g., traffic platform, mapping platform) at each point of time and each road segment on which a traffic report estimation is computed. The qualification, in an embodiment, is done in terms of the amount of input data, freshness of the input data, use of historical traffic patterns, temporal clustering of input data, and potential similarity of input data. Once established, the input characteristics are used to look up a certainty value, or coefficient of certainty value, from a pre-defined look-up table (LUT).

In one embodiment, the system 100 considers a variety of information including real-time data, historical data, and certainty tables. For example, vehicle speed data can be determined from probe data 113 (e.g., a time sequence of location data points associated with an individual probe device 115—<probe identifier, time, latitude, longitude>) collected from one or more probe devices 115 as they travel in a road network. The probe data 113 can be collected in real-time to represent current travel conditions in the road network or can be historical data representing historical travel conditions in the road network. The probe devices 115, for instance, can include one or more location-sensor equipped vehicles 117*a*-117*n* (also referred to as vehicles 117 or floating cars) and/or one or more location-equipped user equipment (UE) devices 119*a*-119*m* (e.g., smartphones, portable or built-in navigation devices, etc.) executing respective applications 121*a*-121*m* (e.g., navigation, mapping, or other location-based applications) associated with the vehicles 117. The mapping platform 109 (e.g., a traffic or mapping system) can then store the received probe data 113 in a probe database 123 where the probe data 113 can be processed into trajectories representing routes or paths traveled by the probe devices 115. The mapping platform, taking into account the received probe data, also receives and selects certainty table data retrieved from a certainty table database 125. The certainty table data contain certainty coefficients to be selected for pre-determined parameters.

In one embodiment, the system 100 (e.g., via the mapping platform 109) generates a traffic report with associated certainty coefficient 127 and continuously updates the traffic report with associated certainty coefficient 127 based on the most recent vehicle speed information (e.g., determined from the most recent probe data 113 in the probe database 123). The continuous update allows the system 100 to adapt the certainty coefficient to sudden changes in traffic conditions.

Figure 2:
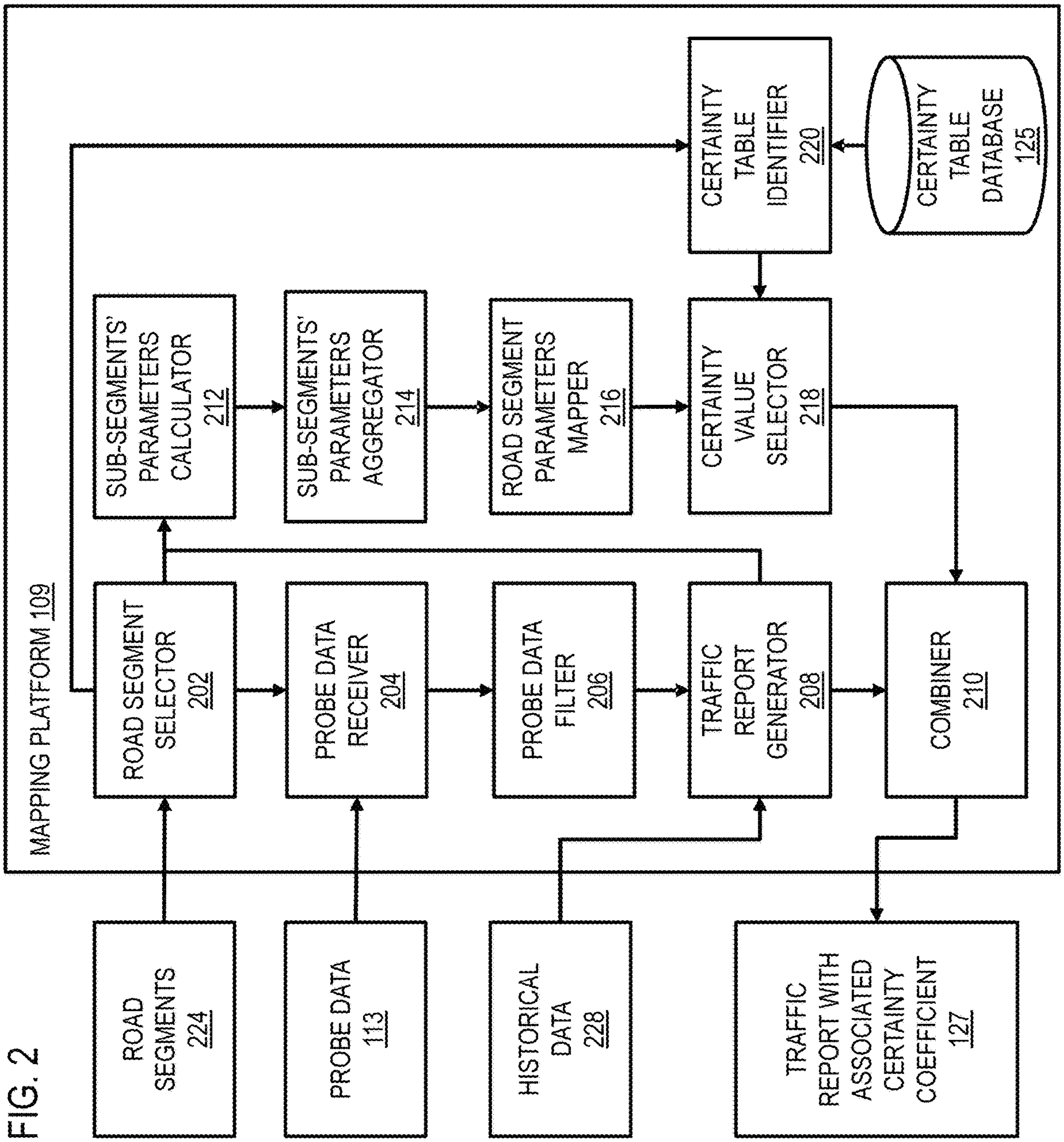
FIG. 2 is a diagram of the components of a mapping platform, according to one embodiment.

As described above, the mapping platform 109 performs the processes associated with traffic report certainty estimation according to various embodiments described herein. FIG. 2 is a diagram of components of the mapping platform 109 for providing a traffic report with associated certainty coefficient, according to an embodiment. As shown, the mapping platform 109 may include or be communicatively connected to one or more components such as: a road segment selector 202, probe data receiver 204, probe data filter 206, traffic report generator 208, combiner, 210, sub-segments' parameters calculator 212, sub-segments' parameters aggregator 214, road segment parameters mapper 216, certainty value selector 218, certainty table identifier 220, and certainty table database 125.

In an embodiment, the road segment selector 202 of the mapping platform 109 selects a road segment from a plurality of road segments 224 that each have at least one sub-segment. A sub-segment is a subsection of a road segment (e.g., a subdivision of a road segment described in terms of a percent offset from a node). The probe data receiver 204 receives probe data 113 (e.g., latitude, longitude, time, speed, heading, vehicle ID). The probe data 113 comprises floating car data directly collected by moving vehicles 117, as opposed to traditional traffic data collected at a fixed location by a stationary device or observer. The probe data filter 206 filters the probe data 113 according to a set of pre-defined rules (e.g., filter the probe data 113 to only include speed data). The traffic report generator 208 generates a real-time traffic report based on filtered probe data received from the probe data filter 206 and historical data 228 (e.g., spatial-temporal historical traffic data). The sub-segment parameters calculator 212, which is communicatively connected with the road segment selector 202 and the traffic report generator 208, calculates at least one spatial-temporal parameter (e.g., the spatial-temporal parameter may include information on how much real-time probe data exists, how many vehicles are providing probe data, or whether the real-time probe data is temporally clustered) for at least one sub-segment of the selected road segment. A sub-segments' parameters aggregator 214 combines the spatial-temporal parameters of each sub-segment of the road segment. A road segment parameters mapper 216 maps the aggregated parameters to corresponding pre-defined value intervals (e.g., traffic on 50% to 100% the probe data is real-time and the probe data is retrieved from at least 2 unique vehicles). From a certainty table database 125, a certainty table identifier 220 identifies a certainty value table (e.g., a look-up table (LUT)) corresponding to the road segment (e.g., identification of a table based on the region in which the road segment is located). A certainty value selector 218, which is communicatively connected with the certainty table identifier 220 and the road segments parameters mapper 216, selects a certainty coefficient value from the identified certainty value table. The combiner 210 then outputs a traffic report with the associated certainty coefficient 127.

According to another embodiment, a system for traffic report certainty estimation can be used for a road segment with any number of sub-segments. For example, in the sub-segment parameters calculator block 312, the properties for each sub-segment are calculated, which determines at a minimum: a number of real-time probes (e.g., probe data points, inputs) from a certain number of available vehicles, a historical traffic pattern utilized in traffic report generation, and whether the real-time probes are temporally clustered. This set of properties can be augmented with the following additional properties: freshness (e.g., the probes are from a time within a given temporal window such as 15 minutes) and similarity (e.g., the probes level of similarity to each other). It is common for traffic models to operate on all the probes within a temporal window. The similarity of real-time probe speeds is especially relevant when determining coefficient of certainty values on road segments with complex traffic conditions. Several methods for multimodality are readily apparent to those of ordinary skill in the art.

In another embodiment, the mapping platform 109 further determines at least one sub-segment coefficient of certainty value from the certainty table identified by the certainty table identifier 220. The determination of the at least one sub-segment coefficient of certainty value is based on at least one sub-segment input characteristic value associated with at least one sub-segment of the road segment, and aggregating the at least one sub-segment coefficient of certainty value to determine the coefficient of certainty value. In an embodiment, for a given road segment, the input availability information of all its sub-segments is aggregated in a sub-segment parameters aggregator 214. The result of the aggregation is minimally expressed as a: percentage of the length of the road segment on which real-time probe data is available, percentage of the length of the segment on which historical traffic information is utilized to some extent or solely, percentage of the length of road segment on which the real-time probe data is temporally clustered, percentage of the length of the road segment on which real-time data is fresh, percentage of the length of the road segment on which real-time probe speeds are similar, or some combination thereof In an embodiment, with temporally-clustered real-time probe data, the at least one input characteristic value may be based on a spatial coverage of the temporally clustered probe data over the road segment, at least one sub-segment of the road segment, or a combination thereof.

According to an embodiment, road segment selector 202 of the mapping platform 109 selects a road segment having at least one sub-segment and generates a traffic report via the traffic report generator 208 for that road segment based on real-time probe data 113 received by the probe data receiver 204 and each sub-segment's historical data 228 received by the traffic report generator 208. The sub-segments' parameters calculator 212 calculates at least one parameter using the real-time probe data received and historical data 228 for each sub-segment to reflect a spatial coverage of the road segment. From the certainty table data base 125, the certainty table identifier 220 identifies a certainty table that corresponds to the road segment. The road segment parameters mapper 216 maps the at least one parameter to one of the pre-defined intervals from the identified certainty table. From that table, the certainty value selector 218 selects a coefficient of certainty value that corresponds to the interval mapped to the at least one parameter. The combiner 210 associates the coefficient of certainty value with the generated traffic report for the road segment.

According to another embodiment, the sub-segments' parameters calculator 212 calculates at least two parameters for a road segment: 1) a percent of the road segment length covered with real-time data, and 2) a percent of the road segment length covered with the real time data combined with historical data for the road segment. The road segment parameters mapper 216 maps the two parameter values to pre-defined value intervals for the two parameters. The certainty value selector 218 selects a pre-assigned coefficient of certainty that corresponds to a combination of the pre-defined value intervals for the two parameters. The combiner 210 combines the coefficient of certainty value with the traffic report for the road segment generated by the traffic report generator 208.

In another embodiment, the sub-segments' parameters calculator 212 calculates at least three parameters for a road segment: 1) a percent of the road segment length covered with real-time data, 2) a percent of the road segment length covered with real-time data combined with historical data for the road segment, and 3) a percent of the road segment length covered with temporally-clustered real-time data. The road segment parameters mapper 216 maps the three parameter values to pre-defined value intervals for the three parameters. The certainty value selector 218 selects a pre-assigned coefficient of certainty that corresponds to a unique combination of the pre-defined value intervals for the three parameters. The combiner 210 combines the coefficient of certainty value with the traffic report for the road segment generated by the traffic report generator 208.

Figure 3:
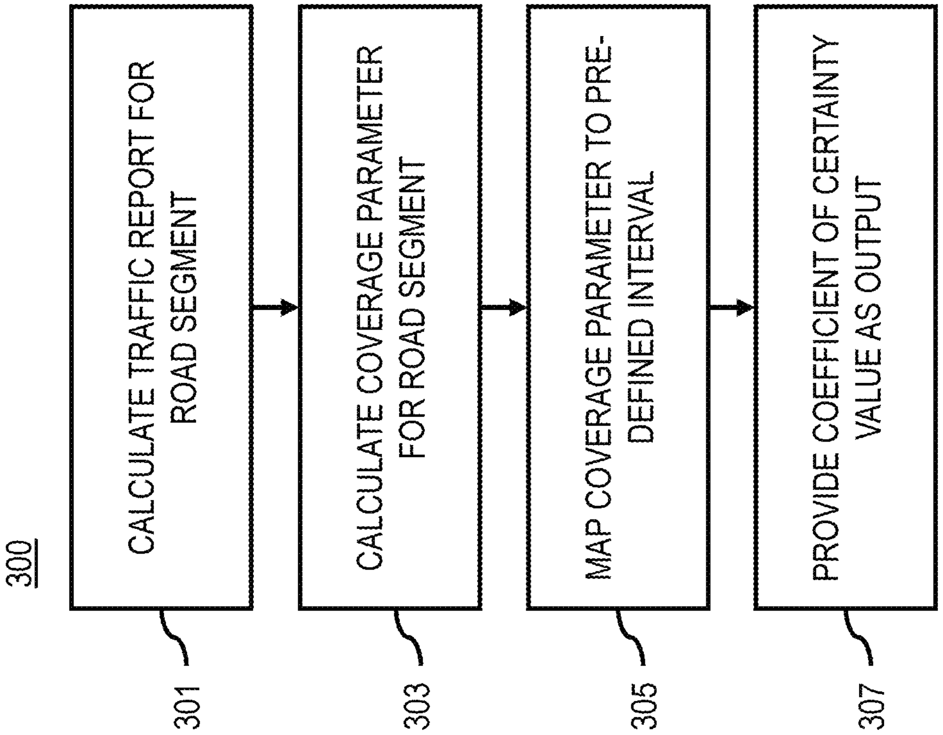
FIG. 3 is a flowchart of a process for traffic report certainty estimation, according to one embodiment.
Figure 10:
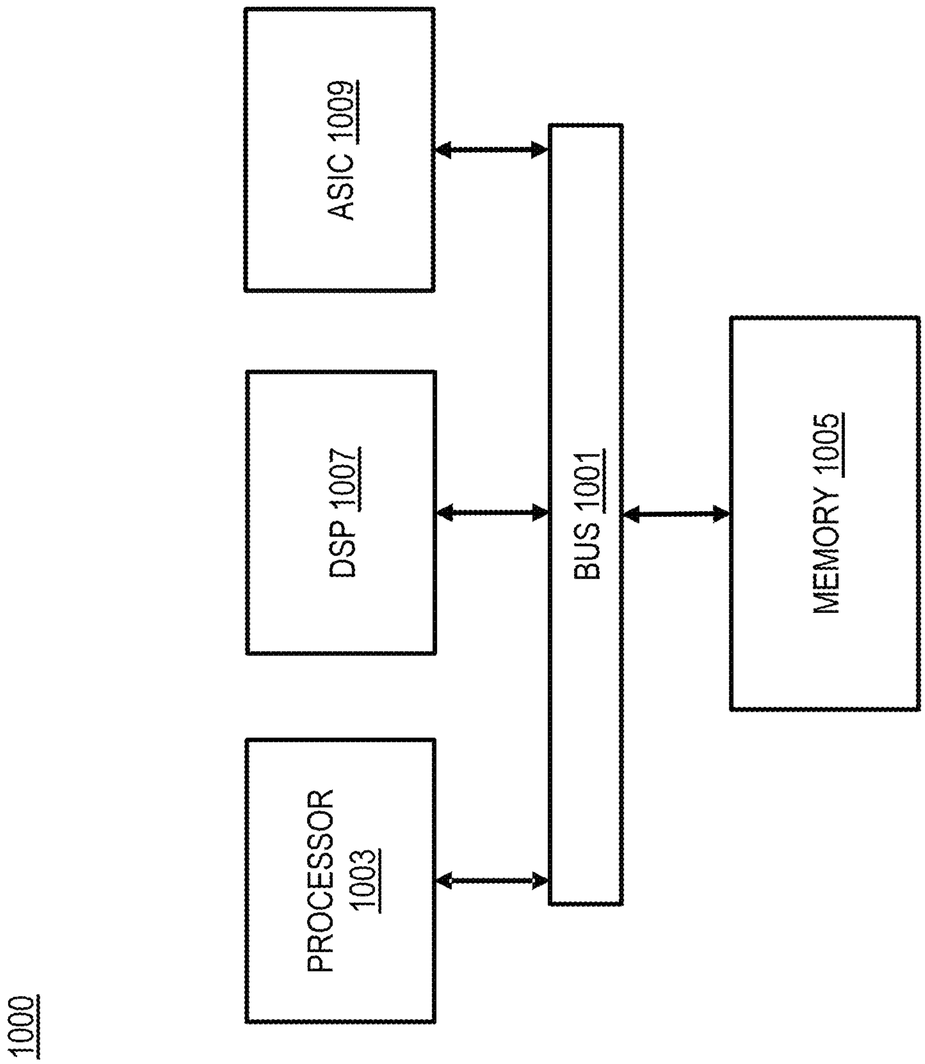
FIG. 10 is a diagram of a chip set that can be used to implement an embodiment.

FIG. 3 is a flowchart of a process for traffic report certainty estimation according to an embodiment. In various embodiments, the mapping platform 109 may perform one or more portions of the process 300 and may be implemented in, for instance, a chip set including a processor and a memory as shown in FIG. 10. As such, the mapping platform can provide means for accomplishing various parts of the process 300, as well as means for accomplishing embodiments of other processes described herein in conjunction with other components of the mapping platform 109. Although the process 300 is illustrated and described as a sequence of steps, it is contemplated that various embodiments of the process 300 may be performed in any order or combination and need not include all of the illustrated steps.

In one embodiment, the mapping platform 109 begins the process 400 with the step of calculating a traffic report for a selected road segment 301 by utilizing real-time probe data 113 collected from one or more sensors of at least one probe device 115. If real-time probe data 113 is not sufficient, historical data may be used in combination with the real-time probe data 113. If real-time probe data 113 is non-existent, then historical probe data may be used exclusively in calculating the traffic report. In an embodiment, the selected road segment has at least one sub-segment. It is contemplated that the road segment may be selected because it falls on a desired route selected by the service requestor 103. The road segments may be selected from a database of road segments located within the geographic database 111 according to an embodiment. The real-time probe data 113 may be input into a mapping platform 109 that implements the process 300 via a communication network 107, although it is contemplated that the real-time probe data 113 may be input using any means.

On calculating a traffic report for the selected road segment 301, the mapping platform 109 performs step 303 by calculating a spatial coverage parameter (e.g., the percent of the road segment covered by real-time data, real-time data combined with historical data, temporally-clustered data, or unique vehicles) for the road segment. In other embodiments, the mapping platform 109 calculates two spatial coverage parameters: 1) a percent of the road segment length covered with real-time data, and 2) a percent of the road segment length covered with the real-time data combined with the road segment historical traffic information. In a further embodiment, a third spatial coverage parameter is calculated in combination with the two spatial coverage parameters—a percent of the road segment length covered with temporally clustered real-time data. It is contemplated that many other suitable spatial coverage parameters may be calculated for purposes of traffic report certainty estimation. For example, such spatial coverage parameters may include the percent of road segment covered by probe data that is: sent via a specific communication means, collected by a certain type of sensor, or indicated by high similarity with a stationary traffic data source such as a traffic camera and associated traffic analysis algorithm).

With step 305, the mapping platform 109 maps the spatial coverage parameter to a pre-defined interval of the parameter contained in a certainty table associated with the road segment. The pre-defined interval of the parameter may, for example, be the portion of the table that correlates to 50% to 100% coverage of the road segment with real-time probe data that is temporally clustered and coming from at least 3 unique vehicles. The certainty table associated with the road segment may be so identified, for example, because the certainty table has been correlated for the neighborhood in which the map-matched road segment lies. In other embodiments, the certainty table may be correlated with larger regions such as cities, states, or countries. Mapping the spatial coverage parameter to the pre-defined interval of the certainty table determines a coefficient of certainty value from the certainty table. In certain embodiments, the determined coefficient of certainty may correspond to a combination of pre-defined intervals. In other embodiments, the determined coefficient of certainty may correspond to a unique combination of pre-defined intervals.

In step 307, the mapping platform 109 provides a coefficient of certainty value as an output to be associated with the traffic report.

In an embodiment, the at least one input characteristic can be based, at least in part, on historic traffic information that is spatially related, temporally related, or a combination thereof, to the probe data. The at least one input characteristic value may further be based on a spatial coverage of the probe data, the historical traffic information, or a combination thereof over the road segment, at least one sub-segment of the road segment, or a combination thereof. In one embodiment, the at least one input characteristic value may be based, at least in part, on an available amount of the probe data, a count of different probe identifiers associated with the probe data, similarity of one or more probe speeds indicated in the probe data, or a combination thereof In an embodiment, the pre-assigned coefficient of certainty value is mapped to a respective unique combination of the one or more value intervals for different characteristics of the at least one characteristic value.

Figure 4:
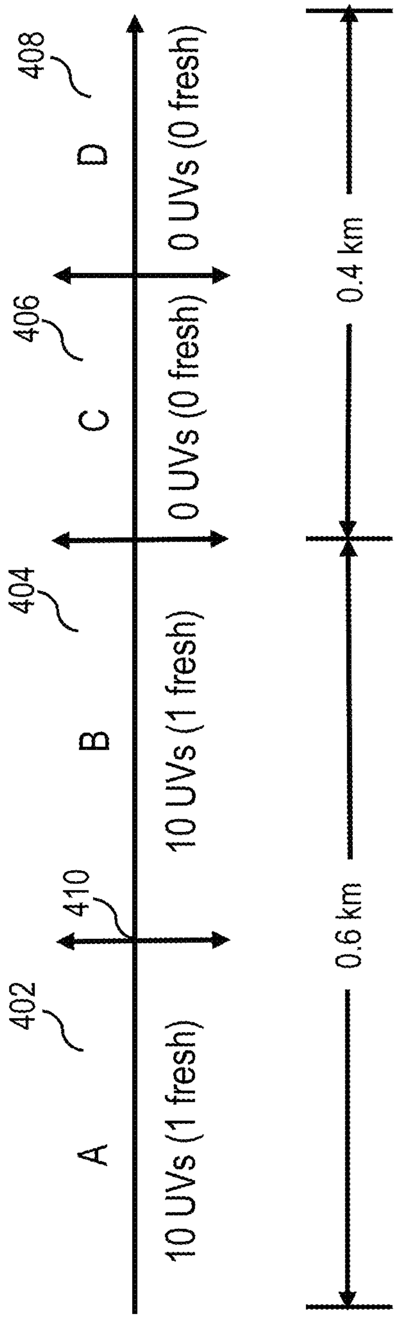
FIG. 4 is a diagram depicting a road segment, according to one embodiment.

FIG. 4 is a diagram depicting a road segment according to an embodiment. The diagram depicts the variances of probe data that can occur on one road segment 400 comprised of four sub-segments. The sub-segments are: sub-segment A 402, sub-segment B 404, sub-segment C 406, and sub-segment D 408. Sub-segments A 402 and B 404 comprise a length 0.6 km. Sub-segments C 406 and D 408 comprise a length 0.4 km. Together, the sub-segments form a road segment that is 1.0 km in length. There are 10 unique vehicles (UVs) reporting in real-time on sub-segment A 402, 10 UVs reporting on sub-segment B 404, and no UVs reporting on sub-segments C 406 and D 408. Note that the UVs reporting on sub-segment A 402 and the UVs reporting on sub-segment B 404 need not be the same. For example, if there is an intersection 410 at the point where the sub-segments A 402 and B 404 meet, some of the 10 vehicles traversing sub-segment A 402 may have turned on the intersecting road, while some new vehicles have turned from the intersecting road onto the sub-segment B 404. Furthermore, though on sub-segments A 402 and B 404 there are 10 UVs within the temporal window of interest (e.g. 30 minutes), only 1 of those UVs is fresh (e.g., real-time data can be qualified as fresh if it is coming from a vehicle that traversed the sub-segment of interest within a pre-selected temporal window such as the last 6 minutes). Further, the length of sub-segments of a road segment need not be uniform. Sub-segments A 402 and B 404 are 0.3 km each in length, while segments C 406 and D 408 are 0.2 km each in length.

FIG. 5 depicts a look-up table (LUT) 500 (e.g., a coefficient of certainty value table) according to one embodiment. In this embodiment, the LUT is a partial table. The information contained in the LUT can be utilized with the scenario of FIG. 4. The LUT 500 combines two spatial coverage parameters: one involving real-time probe data (e.g., speed data) and the other involving the presence of at least one UV providing fresh probe data. Rows 1-4 in the table correspond to the spatial coverage parameter that indicates real-time probe data coverage within the interval of 50% to 100% of the road segment, while rows 5-8 correspond to 100% coverage of the road segment by real-time probe data. The LUT also corresponds to the spatial coverage parameter that indicates fresh probe data coverage from at least one UV within a variety of increasing intervals. In rows 1-4, the fresh probe data coverage increases from 0% to 100% in intervals of 50% per row and repeats with rows 5-8. Each row has an associated coefficient of certainty (e.g., the opposite of an certainty coefficient). In this embodiment, the coefficient of certainty value is highest, 0.99, when the real-time probe data and fresh probe data parameters both indicate 100% coverage of the road segment.

In other embodiments, a spatial coverage parameter associated with the LUT may indicate coverage of the road segment by historical data so that the reported speed, for example, is a mix of real-time probe data and historical data. If the historical data provides more coverage over the road segment than the real-time probe data, then the certainty of the reported speed is lower given the heavier reliance on historical data, which therefore corresponds to a lower coefficient of certainty value. In cases where the real-time probe data provides more coverage over the road segment than the historical data, then the certainty of the reported speed is higher, corresponding with a higher coefficient of certainty value.

Applying the LUT 500 to the road segment example in FIG. 4, the coefficient of certainty associated with a traffic report for that road segment would be 0.75 because over 50%, but less than 100%, the road segment is covered by probe data, and over 50% but less than 100% of the road segment is covered by fresh probe data.

In other embodiments, the coefficients of certainty for an LUT may be calculated by applying different weights to the variety of spatial coverage parameter values or assigning them to higher orders of magnitude. In another embodiment, the coefficients of certainty may be determined by a feedback control and the application of transfer functions. For example, the coefficients of certainty contained in an LUT may be regularly updated by comparing the traffic reports with associated coefficients of certainty with verified traffic data, thereby assessing the reliability of the coefficients themselves. Coefficients of certainty need not be expressed as percentages or probabilities.

Figure 6:
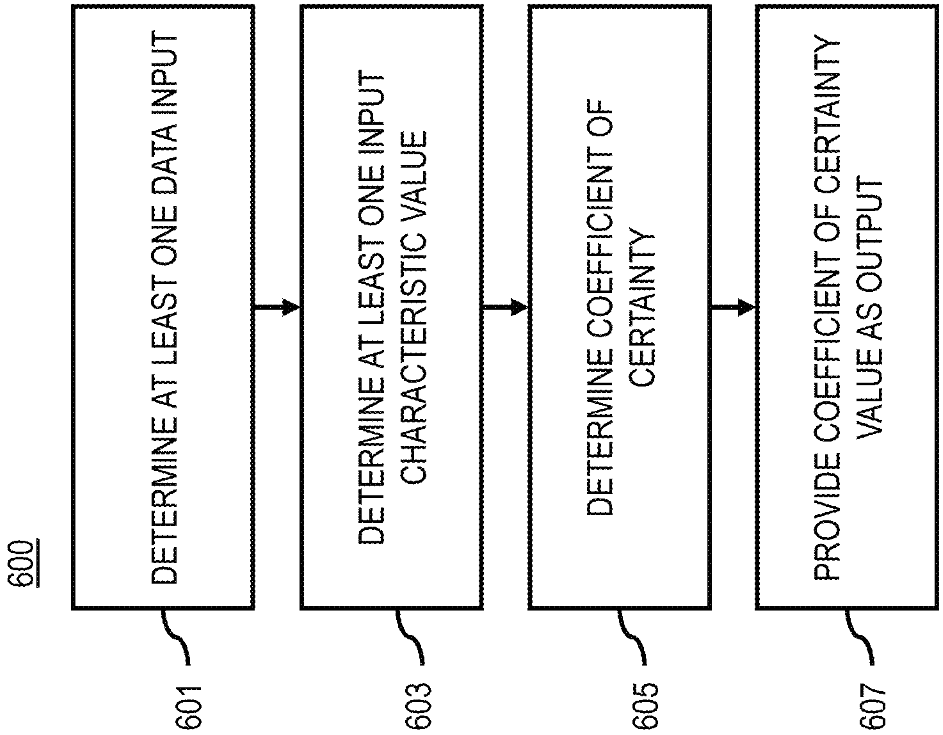
FIG. 6 depicts a flowchart of a process for traffic report certainty estimation, according to one embodiment.

FIG. 6 is a flowchart of a process for traffic report certainty estimation according to an embodiment. In various embodiments, the mapping platform 109 may perform one or more portions of the process 600 and may be implemented in, for instance, a chip set including a processor and a memory as shown in FIG. 10. As such, the mapping platform can provide means for accomplishing various parts of the process 300, as well as means for accomplishing embodiments of other processes described herein in conjunction with other components of the mapping platform 109. Although the process 300 is illustrated and described as a sequence of steps, it is contemplated that various embodiments of the process 300 may be performed in any order or combination and need not include all of the illustrated steps.

In one embodiment, the mapping platform 109 begins the process 600 with step 601 by determining at least one data input (e.g., real-time speed data) received by the mapping platform 109. The at least one data input is utilized by the mapping platform 109 to generate a traffic report estimation (e.g., traffic report, traffic condition report, traffic estimation). The at least one data input is based, at least in part, on probe data 113 collected from one or more sensors (e.g., a speedometer, a radar system, a LiDAR system, a global positioning sensor for gathering location data) of at least one probe device 115.

With step 603, the mapping platform 109 determines at least one input characteristic value associated with the at least one data input. In an embodiment, the input characteristic value may indicate the extent of the at least one data input's spatial coverage of a road segment in terms of a percentage value.

On determining the at least one input characteristic value, the mapping platform 109 in step 605 determines a coefficient of certainty value from a certainty table (e.g., LUT, coefficient of certainty table) based on the at least one input characteristic value, wherein the certainty table respectively maps one or more value intervals of the at least one input characteristic value to a pre-assigned coefficient of certainty value. The value intervals, in an embodiment, may represent, in percentage terms, a range of road segment coverage by the at least one data input. As an example, the at least one data input may cover 45 percent of the road segment, which may map to a value interval of 30 to 50 percent found in an associated certainty table, and therefore the mapping determines the coefficient of certainty value, which was pre-assigned to that value interval.

In step 607, the mapping platform 109 then provides the coefficient of certainty as an output to be associated with the traffic report estimation.

Figure 7:
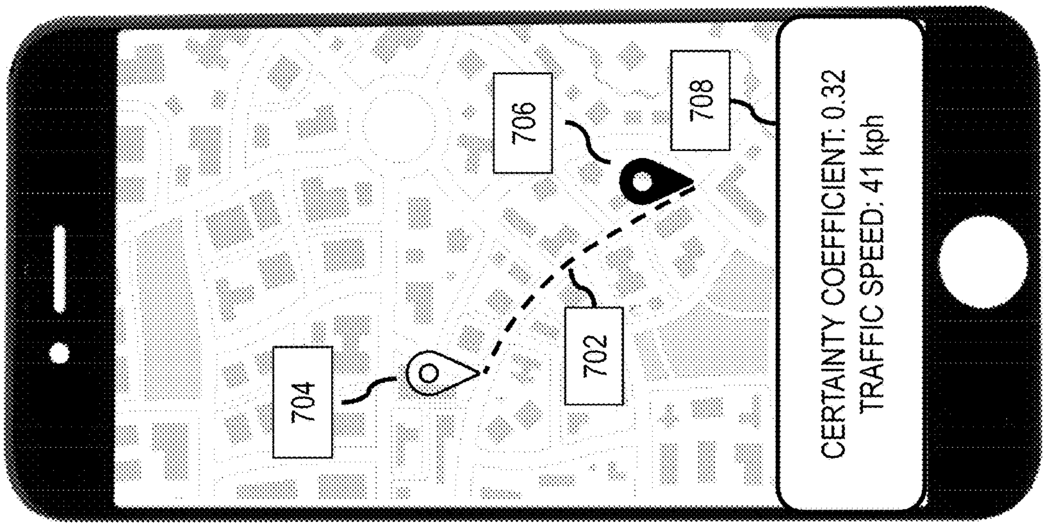
FIG. 7 illustrates a user interface, according to an embodiment.

FIG. 7 illustrates an exemplary UI 700 that can be an end user's (e.g., consumer's) device (e.g., UE 119 or equivalent) via a respective application 121 (e.g., navigation, mapping application). The mapping platform 109 can provide a traffic report with associated certainty coefficient 127 to the respective application 121 to present to the end user. As shown, the UI 700 presents a mapping display with a representation 702 of the road segment (e.g., vehicle location), with a representation 704 of the road segment's start node and a representation 706 of the road segment's end node. UI element 708 displays the traffic report with associated certainty coefficient 127 for the current time.

Revisiting FIG. 1, in some example embodiments, the mapping platform 109 may be implemented in a cloud computing environment. In some other example embodiments, the mapping platform 109 may be implemented in a vehicle 117. All the components in the system 100 may be coupled directly or indirectly to the communication network 107. The components described in the system 100 may be further broken down into more than one component and/or combined together in any suitable arrangement. Further, one or more components may be rearranged, changed, added, and/or removed.

In one embodiment, vehicles 117 are configured with various probe devices 115 for generating or collecting vehicular probe data, related geographic/map data, etc. In one embodiment, the probed data represent probe data associated with a geographic location or coordinates at which the probe data was collected. In this way, the probe data can act as observation data that can be separated into location-aware training and evaluation datasets according to their data collection locations as well as used for embedding information into probe data to the embodiments described herein. By way of example, the probe devices may be a variety of sensors including, but not limited to, a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Probe devices can be devices carried by travelers (e.g., user equipment 119) and/or vehicles 117 configured with in-vehicle telematics capable of producing probe data. Each probe device relays its location and travelling data, such as location, speed, direction, a respective timestamp, and/or other related data in a data stream in real-time, or at a fixed or variable refresh rate. By way of example, the other data may include a probe type (e.g., a smartphone, an in-vehicle telematics system, etc.), a probe model (e.g., a smartphone model number, vehicle model, etc.), a density, a queue, a turning ratio, a route preference, etc. Probe data 113 may be published by public entities (e.g., government/municipality agencies, local police, etc. operating fixed-sensor networks), third-party official/semi-official sources (e.g., automated toll-tag system operators), private entities (e.g., cellphone carriers, automated vehicle location service providers, etc.), and/or one or more services 105.

Other examples of probe devices 115 of a vehicle 117 may include orientation sensors augmented with height sensors and acceleration sensors (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of a vehicle 117 may detect the relative distance of the vehicle from a physical divider, a lane or roadway, the presence of other vehicles (e.g., distances between vehicles during free flow travel and distances during periods of high congestion), pedestrians, traffic lights, potholes and any other objects, or a combination thereof. In one scenario, the sensors may detect weather data, traffic information, or a combination thereof In one embodiment, a vehicle 117 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, a probe data provider (e.g., via a traffic platform 111, services 105, or equivalent) monitors the feeds of raw probe data from probes and various other sources (e.g., roadside sensors, etc.), extracts and provides probe data 113 and/or other applications/functions based on the probe data 113 (e.g., displays the location of traffic jams and/or closures on a map, generates navigation routes to avoid reported jams/closures, etc.). Generally, sensors from the probes (e.g., cars, drones, phones, etc.) can generate a high volume of probe data (e.g., millions of probe points) that is logged and stored for various use-cases (e.g., real-time traffic monitoring, digital mapping, navigation, etc.).

As shown in FIG. 1, the system 100 comprises a plurality of user equipment (UE) 119*a*-119*m* (e.g., also known as UE 119) having connectivity to a mapping platform 109 via a communication network 107. By way of example, the communication network 107 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

In one embodiment, the UE 119 can be associated with any of the vehicles 117 or a user or a passenger of a vehicle 117. By way of example, the UE 119 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 119 can support any type of interface to the user (such as "wearable" circuitry, etc.). In one embodiment, the vehicles 117 may have cellular or wireless fidelity (Wi-Fi) connection either through the inbuilt communication equipment or the UE 119 associated with the vehicles 117. Also, the UE 119 may be configured to access the communication network 107 by way of any known or still developing communication protocols. In accordance with one embodiment, the UE 119 may be configured to provide navigation and map functions (e.g., guidance and map display along with the traffic conditions of a route for an end user (not shown in FIG. 1). The UE 119 may indicate a coefficient of certainty value for the traffic conditions. The UE 119 may be a part of the vehicles 117. The UE 119 may be installed in the vehicles 117. In accordance with an embodiment, the UE 119 may be the vehicle itself.

The UE 119 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 119 can support any type of interface to the user (such as "wearable" circuitry, etc.).

The geographic database 111 may comprise suitable logic, circuitry, and interfaces that may be configured to store data related to the traffic condition of the intersection. The data may include traffic data. The data may also include cartographic data, routing data, and maneuvering data. The traffic data may include a count of the identified one or more movable objects for each lane of the plurality of lanes associated with the intersection and capacity of each lane, based on one or more of lane function class and lane geometry. The traffic conditions may indicate a coefficient of certainty value for the actual traffic conditions in each lane.

In some embodiments, the geographic database 111 may be a part of a mapping platform. The geographic database 111 may be a master map database stored in a format that facilitates updating, maintenance, and development. For example, the master map database or data in the master map database may be in an Oracle spatial format or other spatial format, such as, for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as the UEs 119. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received geographic database 111 in a delivery format to produce one or more compiled navigation databases.

In some embodiments, the geographic database 111 may be a master geographic database configured on the side of the mapping platform 109. In accordance with an embodiment, a client-side map database may represent a compiled navigation database that may be used in or with end user devices (e.g., the UEs 119) to provide navigation based on the traffic conditions, speed adjustment, and/or map-related functions to navigate through the plurality of lanes associated with the intersection in the region. The mapping platform 109 may identify traffic objects (also referred as objects), based on a trained identification model and such identified objects are map-matched on links of a map developed by the map developer.

Optionally, the geographic database 111 may contain lane segment and node data records or other data that may represent the plurality of lanes for the intersection on the road in the region, pedestrian lane or areas in addition to or instead of the vehicle road record data. The road/link segments and nodes may be associated with attributes, such as geographic coordinates, street names, address ranges, speed limits, turn restrictions at intersections, and other navigation related attributes, as well as Point of Interests (POIs), such as fueling stations, hotels, restaurants, museums, stadiums, offices, auto repair shops, buildings, stores, and parks. The geographic database 111 may additionally include data about places, such as cities, towns, or other communities, and other geographic features such as bodies of water, mountain ranges, etc. In addition, the geographic database 111 may include event data (e.g., traffic incidents, construction activities, scheduled events, unscheduled events, etc.) associated with POI data records or other records of the geographic database 111 associated with the mapping platform 109.

In one embodiment, the vehicles 117, for instance, are part of a probe-based system for collecting probe data for embedding information (e.g., a watermark) therein. In one embodiment, each vehicle 117 is configured to report probe data as probe points, which are individual data records collected at a point in time that records telemetry data for that point in time.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 117 may include probe devices 115 for reporting measuring and/or reporting attributes. The attributes can also be any attribute normally collected by an on-board diagnostic (OBD) system of the vehicle, and available through an interface to the OBD system (e.g., OBD II interface or other similar interface). In one embodiment, this data allows the system 100 to determine a probe entry point, a probe exist point, or a combination thereof occurring at a boundary of the partition (e.g., partition 201). The probe points can be reported from the vehicles 117 in real-time, in batches, across a plurality of time epochs, continuously via streaming or a channel, or at any other frequency requested by the system 100 over, for instance, the communication network 117 for processing by the traffic platform 111. The probe points also can be mapped to specific road links stored in the geographic database 109.

In one embodiment, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the service platform 101, services 105, and/or vehicles 117 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

In one embodiment, the service platform 101 may provide the plurality of services 105 (such as, navigation related functions and services) to the UEs 119. The services 105 may include navigation functions, speed adjustment functions, traffic condition related updates, weather related updates, warnings and alerts, parking related services and indoor mapping services. In accordance with an embodiment, the service platform 101 and the mapping platform 109 may be integrated into a single platform to provide a suite of mapping and navigation related applications for OEM devices, such as the UEs 119. The UEs 119 may be configured to interface with the service platform 101 and the mapping platform 109 over the network 120. Thus, the mapping platform 109 and the service platform 101 may enable provision of cloud-based services for the UEs 119, such as, storing the data related to traffic conditions in the OEM cloud in batches or in real-time and retrieving the stored data for generating traffic condition notification.

In an embodiment, the mapping platform 109 communicatively connected with a Traffic Message Channel (TMC), a technology for delivering traffic and travel information to motor vehicle drivers. TMC is digitally coded using the ALERT C or TPEG protocol into RDS TMC Type 8A groups carried via conventional FM radio broadcasts. It can also be transmitted on Digital Audio Broadcasting or satellite radio. TMC allows silent delivery of dynamic information suitable for reproduction or display in the user's language without interrupting audio broadcast services. Both public and commercial services are operational in many countries. When data is integrated directly into a navigation system, traffic information can be used in the system's route calculation. A TMC may be comprised of multiple sub-segments on which traffic speed is computed before being rolled up into TMC speed.

By way of example, the UEs 119, the probe devices 115, and the mapping platform 109 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically characterized by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

It is also contemplated that the probe devices 115 may have connectivity to mapping platform 109 via connection to the network 120 while bypassing connectivity with any UE 119.

Figure 8:
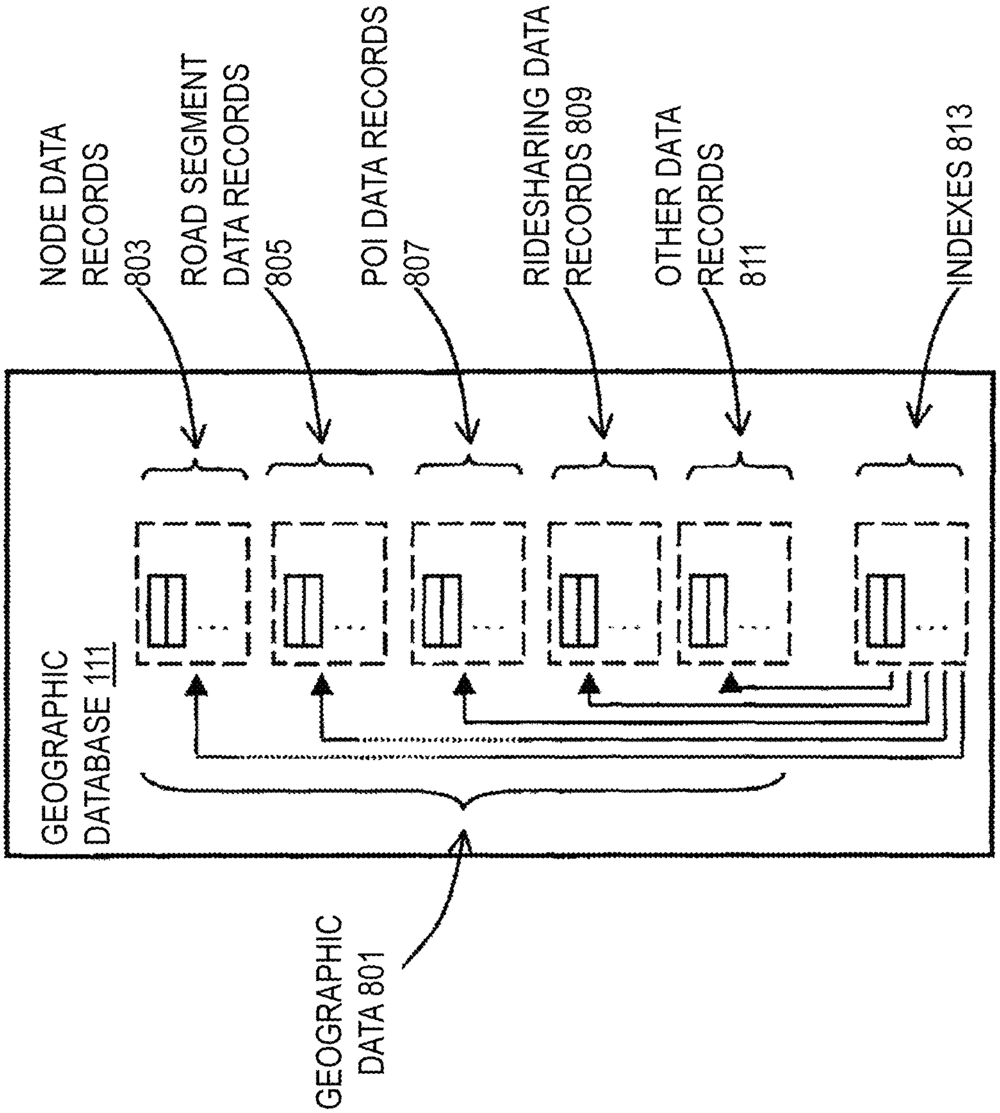
FIG. 8 is a diagram of a geographic database, according to an embodiment.

FIG. 8 is a diagram of a geographic database 111, according to one embodiment. In one embodiment, the geographic database 111 includes geographic data 801 used for (or configured to be compiled to be used for) mapping and/or navigation-related services, such as for constructing routes, e.g., encoding and/or decoding parametric representations into paths and/or routes. In one embodiment, the geographic database 111 includes high resolution or high definition (HD) mapping data that provide centimeter-level or better accuracy of map features. For example, the geographic database 111 can be based on Light Detection and Ranging (LiDAR) or equivalent technology to collect billions of 3D points and model road surfaces and other map features down to the number lanes and their widths. In one embodiment, the HD mapping data (e.g., Other data records 811) capture and store details such as the slope and curvature of the road, lane markings, roadside objects such as signposts, including what the signage denotes. By way of example, the HD mapping data enable highly automated vehicles to precisely localize themselves on the road, and to determine road attributes (e.g., learned speed limit values) to at high accuracy levels. In some embodiments, the HD mapping data also comprises temporal information (e.g., timestamps) relating to the service request.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 111 is stored as a hierarchical or multi-level tile-based projection or structure. More specifically, in one embodiment, the geographic database 111 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 111 includes node data records 803, road segment or link data records 805, POI data records 807, ridesharing data records 809, other data records 811, and indexes 813, for example. More, fewer, or different data records can be provided. In one embodiment, additional data records (not shown) can include cartographic ("carto") data records, routing data, and maneuver data. In one embodiment, the indexes 813 may improve the speed of data retrieval operations in the geographic database 111. In one embodiment, the indexes 813 may be used to quickly locate data without having to search every row in the geographic database 111 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as points of interest (POIs), such as gasoline stations, hotels, restaurants, museums, stadiums, offices, automobile dealerships, auto repair shops, buildings, stores, parks, etc. The geographic database 111 can include data about the POIs and their respective locations in the POI data records 807. The geographic database 111 can also include data about places, such as cities, towns, or other communities, and other geographic features, such as bodies of water, mountain ranges, etc. Such place or feature data can be part of the POI data records 1107 or can be associated with POIs or POI data records 807 (such as a data point used for displaying or representing a position of a city).

In one embodiment, the geographic database 111 can also include ridesharing data records 809 for storing routes previously traversed by probe devices 115 (e.g., including paths and/or routes with associated times determined according to the embodiments described herein) as well as data on traveled routes and their respective properties. In addition, the ridesharing data records 809 can store post-processing rule sets for propagating, correcting, and/or reducing the uncertainties in the routes, paths, and/or probe data. The ridesharing data records 809 can also store data selection rules (e.g., in a map data extension layer) for selecting from among multiple sets of route data that may be available for a given road link. The ridesharing data records 809 can also store confidence or accuracy determinations for the route and/or path data. By way of example, the ridesharing data records 809 can be associated with one or more of the node records 803, road segment records 805, and/or POI data records 807 to support use cases such as enhanced mapping UIs, autonomous driving, dynamic map updates, etc. In one embodiment, the ridesharing data records 809 are stored as a data layer of the hierarchical tile-based structure of the geographic database 111 according to the various embodiments described herein. In one embodiment, the geographic database 111 can provide the tile-based route detection ridesharing data records 809 to automate route data propagation in a road network using route and/or path construction and selection.

In one embodiment, as discussed above, the other data records 811 model road surfaces and other map features to centimeter-level or better accuracy. The other data records 811 may also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the other data records 811 are divided into spatial partitions of varying sizes to provide data to probe devices 115 and other end user devices with near real-time speed without overloading the available resources of the probe vehicles 117 and/or devices 115 (e.g., computational, memory, bandwidth, etc. resources).

In one embodiment, the other data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the other data records 811.

In one embodiment, the other data records 811 may also include real-time sensor data collected from probe devices 115 in the field. The real-time sensor data, for instance, integrates real-time traffic information, weather, and road conditions (e.g., potholes, road friction, road wear, etc.) with highly detailed 3D representations of street and geographic features to provide precise real-time information also at centimeter-level accuracy. Other sensor data can include vehicle telemetry or operational data such as windshield wiper activation state, braking state, steering angle, accelerator position, and/or the like.

In one embodiment, the geographic database 111 can be maintained by the service requestor 103 in association with the ridesharing service 119 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle (e.g., vehicle 117 and/or UE 119) along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 117 or UE 119. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a ridesharing wait time prediction and/or pickup route selection may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed herein.

The processes described herein for providing traffic report certainty estimation may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
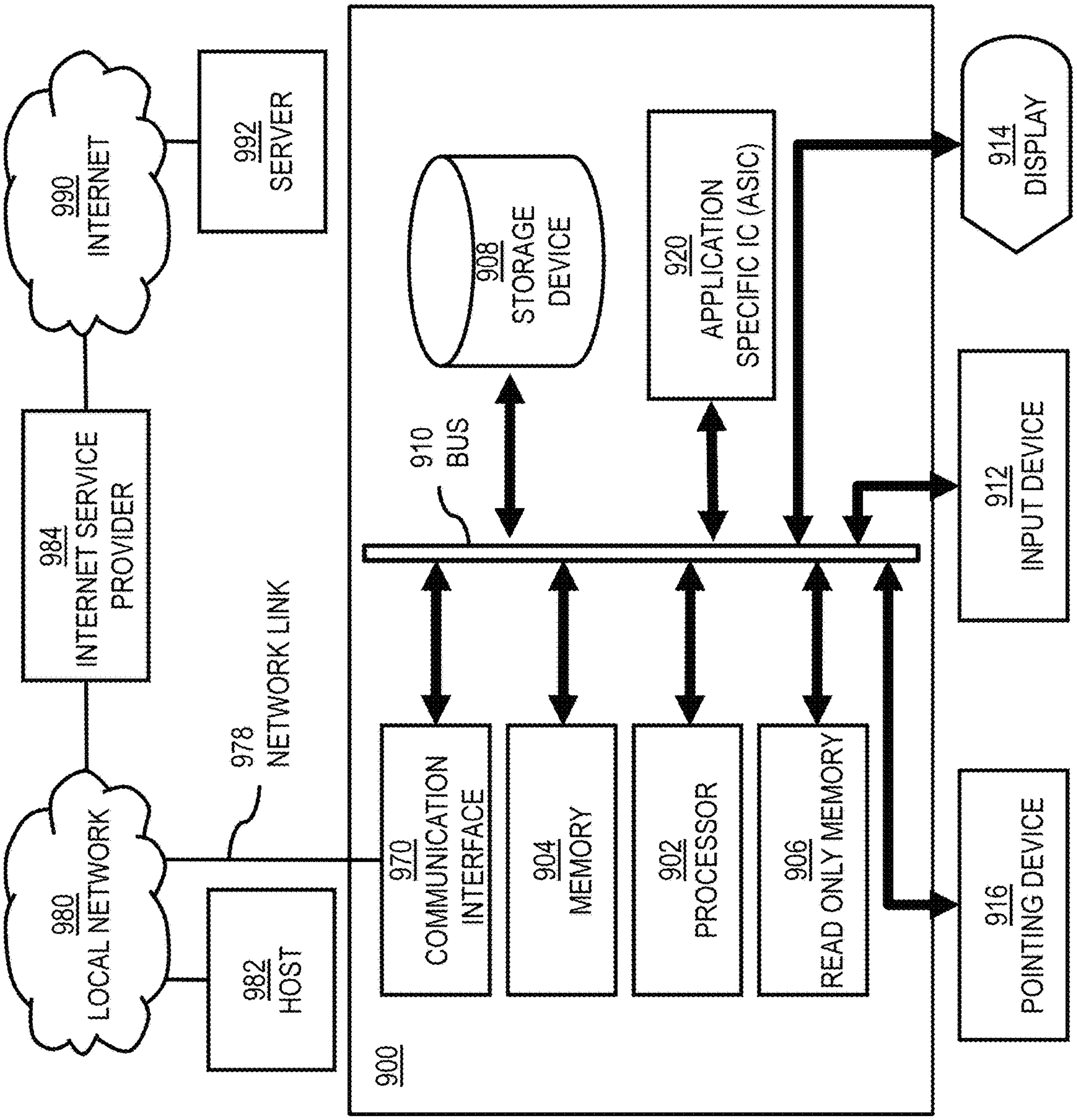
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to traffic report certainty estimation as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to traffic report certainty estimation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for traffic report certainty estimation. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for traffic report certainty estimation, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general, the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for traffic report certainty estimation to the UE 119.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

FIG. 10 illustrates a chip set 1000 upon which an embodiment of the invention may be implemented. Chip set 1000 is programmed to traffic report certainty estimation as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to traffic report certainty estimation. The memory 1005 also stores the data associated with or generated by the execution of the inventive steps.

Figure 11:
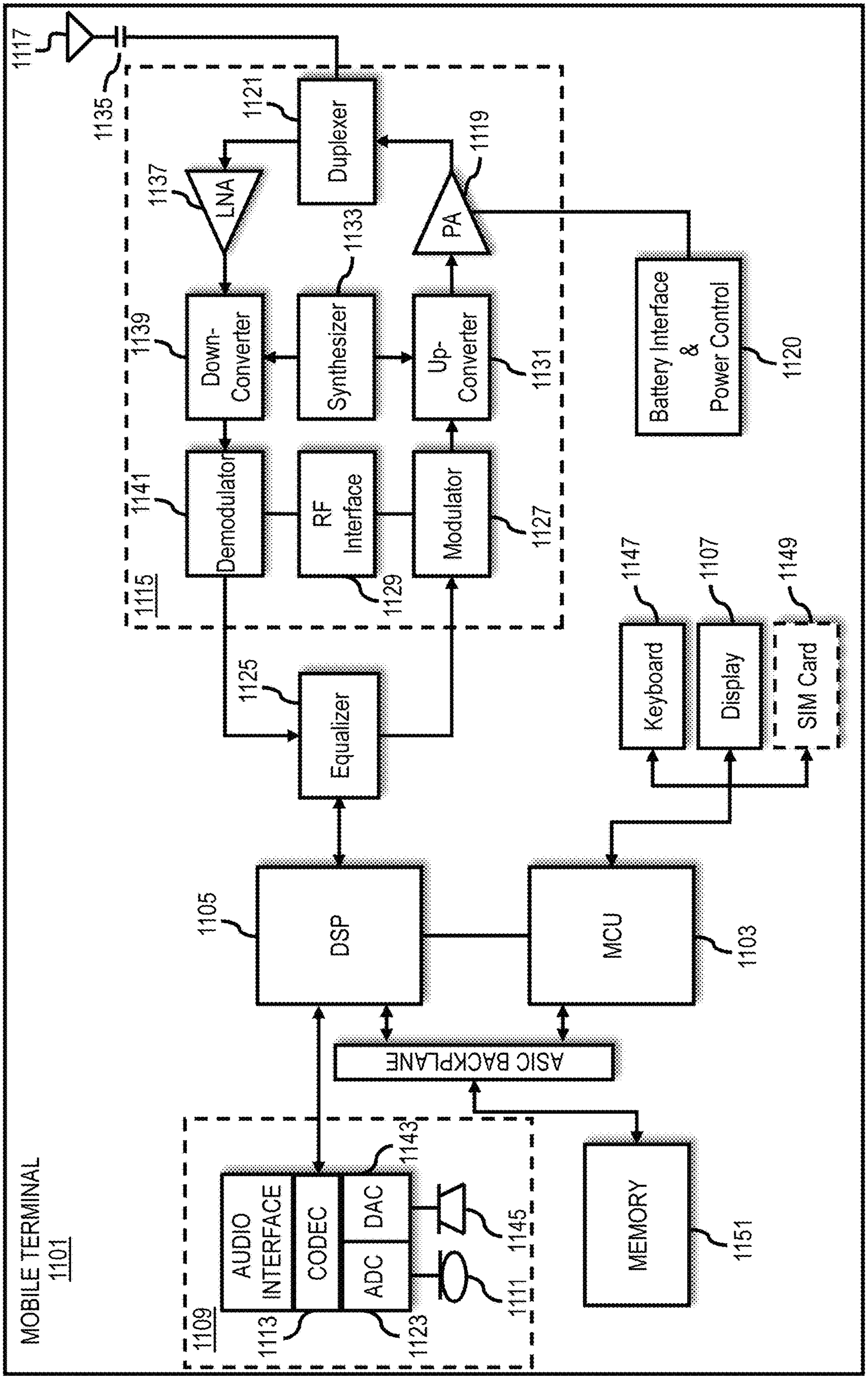
FIG. 11 is a diagram of a mobile station (e.g., handset) that can be used to implement an embodiment.

FIG. 11 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to traffic report certainty estimation. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for traffic report certainty estimation comprising:

calculating a traffic report for a road segment based on real-time probe data collected from one or more sensors of at least one probe device;

calculating a real-time spatial coverage parameter for the road segment, wherein the real-time spatial coverage parameter indicates a percentage of the road segment covered by the real-time probe data;

mapping the real-time spatial coverage parameter to a pre-defined interval of a certainty table associated with the road segment to determine a coefficient of certainty value for the traffic report; and providing the coefficient of certainty value as an output.

2. The method of claim 1, wherein the road segment comprises one or more sub-segments, and wherein the real-time spatial coverage parameter is based on one or more sub-segment parameters associated with the one or more sub-segments.

3. The method of claim 1, further comprising:

calculating a historical spatial coverage parameter for the road segment, wherein the historical spatial coverage parameter indicates a percentage of the road segment covered by historical probe data, and wherein the coefficient of certainty value is further based on the historical spatial coverage parameter.

4. The method of claim 3, further comprising:

mapping the historical spatial coverage parameter to another pre-defined interval of the certainty table, wherein the coefficient of certainty value is selected from a pre-assigned coefficient of certainty associated with a combination of the pre-defined interval and the another pre-defined interval.

5. The method of claim 1, further comprising:

calculating a temporal cluster parameter for the road segment, wherein the temporal cluster parameter indicates a percentage of the road segment covered with the probe data that are temporally clustered, and wherein the coefficient of certainty value is further based on the temporal cluster parameter.

6. The method of claim 5, further comprising:

mapping the temporal cluster parameter to another pre-defined interval of the certainty table, wherein the coefficient of certainty value is selected from a pre-assigned coefficient of certainty associated with a combination of the pre-defined interval and the another pre-defined interval.

7. The method of claim 1, further comprising:

creating a combination of the real-time spatial coverage parameter with at least one other parameter associated with the road segment, a sub-segment of the road segment, or a combination thereof, wherein the coefficient of certainty value is selected from a pre-assigned coefficient of certainty associated with the combination.

8. The method of claim 7, wherein the pre-assigned coefficient of certainty is uniquely associated with the combination.

9. The method of claim 1, further comprising:

processing the probe data to identify one or more unique probe devices, wherein the real-time spatial coverage parameter is based on the one or more unique probe devices.

10. The method of claim 1, wherein the at least one probe device includes a vehicle, a mobile device, or a combination thereof.

11. An apparatus for traffic report certainty estimation comprising:

at least one processor; and at least one memory including computer program code for one or more programs, the at least one memory and the computer program code configured to, with the at least one processor, cause the apparatus to perform at least the following, calculate a traffic report for a road segment based on real-time probe data collected from one or more sensors of at least one probe device;

calculate a real-time spatial coverage parameter for the road segment, wherein the real-time spatial coverage parameter indicates a percentage of the road segment covered by the real-time probe data;

map the real-time spatial coverage parameter to a pre-defined interval of a certainty table associated with the road segment to determine a coefficient of certainty value for the traffic report; and provide the coefficient of certainty value as an output.

12. The apparatus of claim 11, wherein the road segment comprises one or more sub-segments, and wherein the real-time spatial coverage parameter is based on one or more sub-segment parameters associated with the one or more sub-segments.

13. The apparatus of claim 11, wherein the apparatus is further caused to:

calculate a historical spatial coverage parameter for the road segment, wherein the historical spatial coverage parameter indicates a percentage of the road segment covered by historical probe data, and wherein the coefficient of certainty value is further based on the historical spatial coverage parameter.

14. The apparatus of claim 13, wherein the apparatus is further caused to:

map the historical spatial coverage parameter to another pre-defined interval of the certainty table, wherein the coefficient of certainty value is selected from a pre-assigned coefficient of certainty associated with a combination of the pre-defined interval and the another pre-defined interval.

15. The apparatus of claim 11, wherein the apparatus is further caused to:

calculate a temporal cluster parameter for the road segment, wherein the temporal cluster parameter indicates a percentage of the road segment covered with the probe data that are temporally clustered, and wherein the coefficient of certainty value is further based on the temporal cluster parameter.

16. A non-transitory computer readable storage medium for traffic report certainty estimation, including one or more sequences of one or more instructions which, when executed by one or more processors, cause an apparatus to at least perform:

determining at least one data input to a mapping platform for generating a traffic report estimation for a road segment;

determining at least one input characteristic value associated with the at least one data input based, at least in part, on probe data collected from one or more sensors of at least one probe device;

determining a coefficient of certainty value from a certainty table based on the at least one input characteristic value, wherein the certainty table respectively maps one or more value intervals of the at least one input characteristic value to a pre-assigned coefficient of certainty value; and providing the coefficient of certainty value as an output associated with the traffic report.

17. The non-transitory computer readable storage medium of claim 16, wherein the probe data includes real-time probe data, historical probe data, or a combination thereof.

18. The non-transitory computer readable storage medium of claim 16, wherein the at least one input characteristic is further based on historical traffic information that is spatially related, temporally related, or a combination thereof to the probe data.

19. The non-transitory computer readable storage medium of claim 18, wherein the at least one input characteristic value is based on a spatial coverage of the probe data, the historical traffic information, or a combination thereof over the road segment, at least one subsegment of the road segment, or a combination thereof.

20. The non-transitory computer readable storage medium of claim 19, wherein the at least one input characteristic value is based on a spatial coverage of the probe data, the historical traffic information, or a combination thereof over the road segment, at least one subsegment of the road segment, or a combination thereof.

* * * * *